P. LUX.
PAWL SPRING.
APPLICATION FILED OCT. 15, 1919.
1,338,641. Patented Apr. 27, 1920.
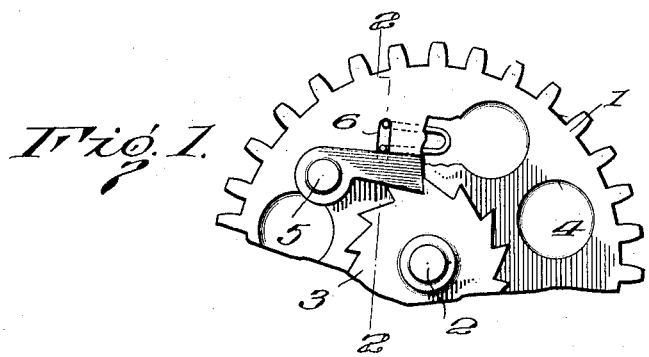
Fig. 1.
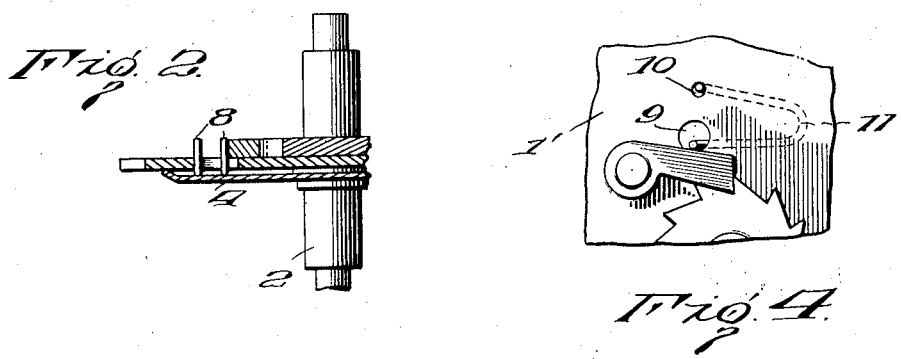
Fig. 2.
Fig. 4.
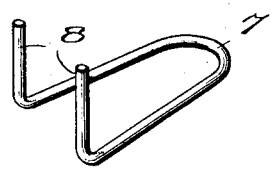
Fig. 3.
Inventor
Paul Lux
By
Attorney

UNITED STATES PATENT OFFICE.

PAUL LUX, OF WATERBURY, CONNECTICUT, ASSIGNOR TO THE LUX CLOCK MANUFACTURING COMPANY INC., OF WATERBURY, CONNECTICUT, A CORPORATION OF CONNECTICUT.

PAWL-SPRING.

1,338,641.  Specification of Letters Patent.  Patented Apr. 27, 1920.

Application filed October 15, 1919. Serial No. 330,730.

*To all whom it may concern:*

Be it known that I, PAUL LUX, a citizen of the United States, residing at Waterbury, in the county of New Haven and State of Connecticut, have invented certain new and useful Improvements in Pawl-Springs, of which the following is a specification, reference being had therein to the accompanying drawing.

This invention relates to a pawl spring construction for a clock, and especially a spring construction for the main wheel, the object being to provide a pawl spring construction which can be readily inserted between the main wheel and the main wheel frictional washer in such a manner that the pawl will be held in contact with the ratchet wheel under spring tension.

Another and further object of the invention is to provide a construction of pawl spring which can be readily inserted or removed, the spring having a free end extending through the main wheel and engaging the pawl.

Another and further object of the invention is to provide a pawl spring which is held in position by the main wheel and frictional washer without fastening the same to the main wheel.

Other and further objects and advantages of the invention will be hereinafter set forth and the novel features thereof defined by the appended claims.

In the drawings:

Figure 1 is a detail plan view of the main wheel partly broken away showing the application of my improved construction of pawl spring.

Fig. 2 is a section taken on the line 2—2 of Fig. 1.

Fig. 3 is a perspective view of the pawl spring detached.

Fig. 4 is a detail plan view of a slightly modified form of main wheel showing the application of the pawl spring.

In the drawing, 1 indicates the main wheel of a clock and 2 the winding arbor on which the main wheel is mounted, and 3 the ratchet wheel fixed to the winding arbor, and 4 the main wheel frictional washer which is preferably formed concaved as shown in Fig. 2, the marginal edge being held in contact with the main wheel.

A pawl 5, is pivotally mounted on the main wheel 1, and is adapted to engage the ratchet wheel 3, and be held in contact therewith by my improved construction of pawl spring which will be hereinafter fully described.

The main wheel 1, is formed with a slot 6, adapted to receive the free ends of a pawl spring 7, one of the ends engaging the pawl 5, and the other the opposite end of the slot, as clearly shown in Fig. 1, so as to hold the pawl in contact with the ratchet wheel.

The pawl spring as herein shown is preferably formed U-shape having angled ends 8, which extend up through the slot 6 of the main wheel and act upon the pawl so as to hold the same on the spring tension in contact with the ratchet.

In the form shown in Fig. 4 instead of forming a slot in the main wheel 1', I form a pair of openings 9 and 10, the opening 9 being of such size to receive the angle end of a spring 11, constructed substantially as shown in Figs. 1, 2 and 3, and the opening 9, being of a greater diameter so as to allow the free end of the spring to work freely within the opening as the pawl rides over the ratchet wheel.

While in the drawing I have shown a substantially U-shaped spring having angled free ends, it is of course understood that I do not wish to limit myself to the form of spring for applying spring tension to the pawl, as I am aware that various shapes and designs of spring can be used to accomplish the desired result without departing from the spirit of my invention, as the main object of my invention is to provide a pawl spring construction capable of being inserted between the main wheel and main wheel frictional washer having a free end extending in the path of the pawl so as to hold the same in contact with the ratchet wheel.

I claim:

1. The combination with the main wheel of a clock having an opening formed therein, of a pawl pivotally mounted on said wheel, a main wheel frictional washer associated with said main wheel, and a spring disposed between said main wheel and washer having one of its ends extended through the opening of said main wheel in the path of travel of said pawl.

2. A pawl spring construction for the main wheel of a clock comprising a spring disposed between the main wheel and main wheel frictional washer, said spring having one of its free ends extended through an opening formed in the main wheel in the path of travel of the pawl carried by the main wheel.

3. The combination with the main wheel of a clock, a pawl and ratchet of a frictional washer arranged against said main wheel, said main wheel having an opening, and a spring disposed between said main wheel and main wheel washer having angled free ends extending through the opening of said main wheel, one of said free ends engaging the pawl for holding the same in contact with the ratchet.

4. A pawl spring construction of the main wheel of a clock comprising a substantially U-shaped spring having angled free ends adapted to extend through an opening formed in the main wheel, one of said free ends being adapted to engage the pawl carried by the main wheel.

5. The combination with the main wheel of a clock having a pawl, of a washer disposed to one side of said main wheel, said main wheel having an opening in alinement with said pawl and a spring disposed loosely between said main wheel and frictional washer having its free ends extended through said opening, one of said free ends engaging the pawl for holding it in contact with its ratchet wheel.

In testimony whereof I hereunto affix my signature in the presence of two witnesses.

PAUL LUX.

Witnesses:
A. H. HAUSER,
HERMAN LUX.